(12) United States Patent
Breda

(10) Patent No.: US 7,578,309 B2
(45) Date of Patent: Aug. 25, 2009

(54) UNIVERSAL KINETIC DIVERTING SPOUT POST ASSEMBLY

(76) Inventor: Silvano Breda, c/o 125 Limestone Crescent, Downsview, Ontario (CA) M3J 2R1

( * ) Notice: Subject to any disclaimer, the term of this patent is extended or adjusted under 35 U.S.C. 154(b) by 514 days.

(21) Appl. No.: 11/132,367

(22) Filed: May 19, 2005

(65) Prior Publication Data
US 2006/0191572 A1 Aug. 31, 2006

(30) Foreign Application Priority Data
Feb. 28, 2005 (CA) .................................... 2498853

(51) Int. Cl.
*E03C 1/02* (2006.01)
(52) U.S. Cl. ............. 137/119.05; 137/801; 137/315.12; 4/678
(58) Field of Classification Search ............ 137/119.03, 137/199.05, 269, 315.12, 801, 119.05; 4/678
See application file for complete search history.

(56) References Cited

U.S. PATENT DOCUMENTS

| | | |
|---|---|---|
| 3,602,244 A | 8/1971 | Ward |
| 3,913,605 A | 10/1975 | Ward |
| 4,116,210 A | 9/1978 | Nelson |
| 4,577,653 A | 3/1986 | Marty |
| 4,862,524 A | 9/1989 | Kimak |
| 5,472,010 A * | 12/1995 | Gonzalez ............... 137/119.08 |
| 6,363,961 B1 * | 4/2002 | Wang .................... 137/119.05 |
| 6,381,770 B1 | 5/2002 | Raisch |
| 6,668,393 B1 | 12/2003 | Mascari et al. |
| 6,978,795 B2 * | 12/2005 | Perrin ................... 137/119.04 |
| 7,082,626 B2 * | 8/2006 | Williams et al. ............... 4/570 |
| 7,313,834 B2 * | 1/2008 | Tan et al. ....................... 4/678 |

FOREIGN PATENT DOCUMENTS

GB 2 300 463 * 11/1996

\* cited by examiner

*Primary Examiner*—Kevin L Lee
(74) *Attorney, Agent, or Firm*—Neil H. Hughes; Ivor M. Hughes; Marcelo K. Sarkis

(57) ABSTRACT

A universal kinetic diverting spout post assembly for mounting in a vertical orientation in a roman tub or deck installation is provided. The assembly includes a valve body containing a replaceable diverting cartridge into which hot and cold water are fed. The cartridge also includes a spring biased plunger assembly normally closing the outlet to a second use, such as a spray, when water normally passes through the spout to a tub and until such time as a diverting mechanism, either in response to a predetermined pressure rise in the spout when water exiting the spout is prevented, or as a direct result of the user lifting the plunger assembly. In either alternative the plunger assembly rises off it's seat and as a result closes the water path to the spout and at the same time opens the normally closed outlet to the spray and allows water to pass to the outlet. The assembly also includes a flow regulator proximate the spray outlet to prevent overpressure in a supply hose and excessive water flow therein.

20 Claims, 9 Drawing Sheets

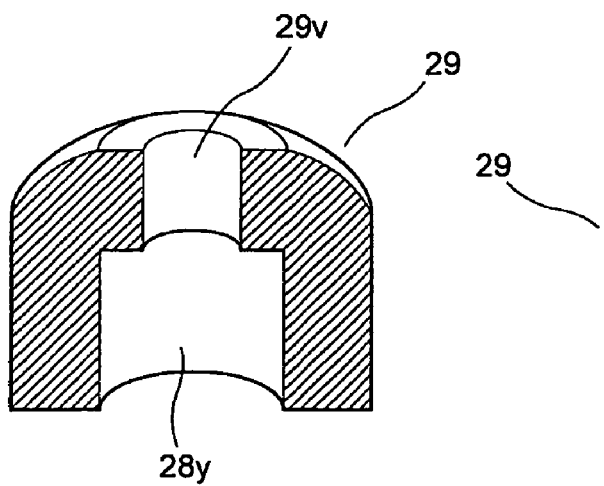 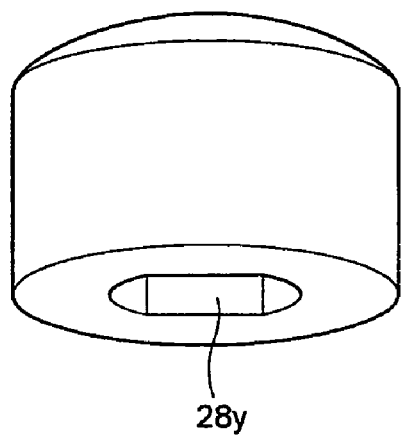
Figure 10A      Figure 10B
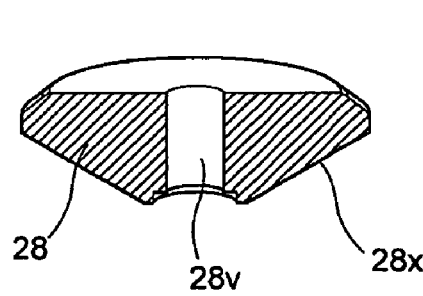 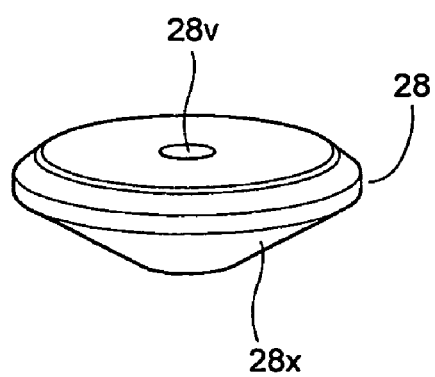
Figure 11A      Figure 11B

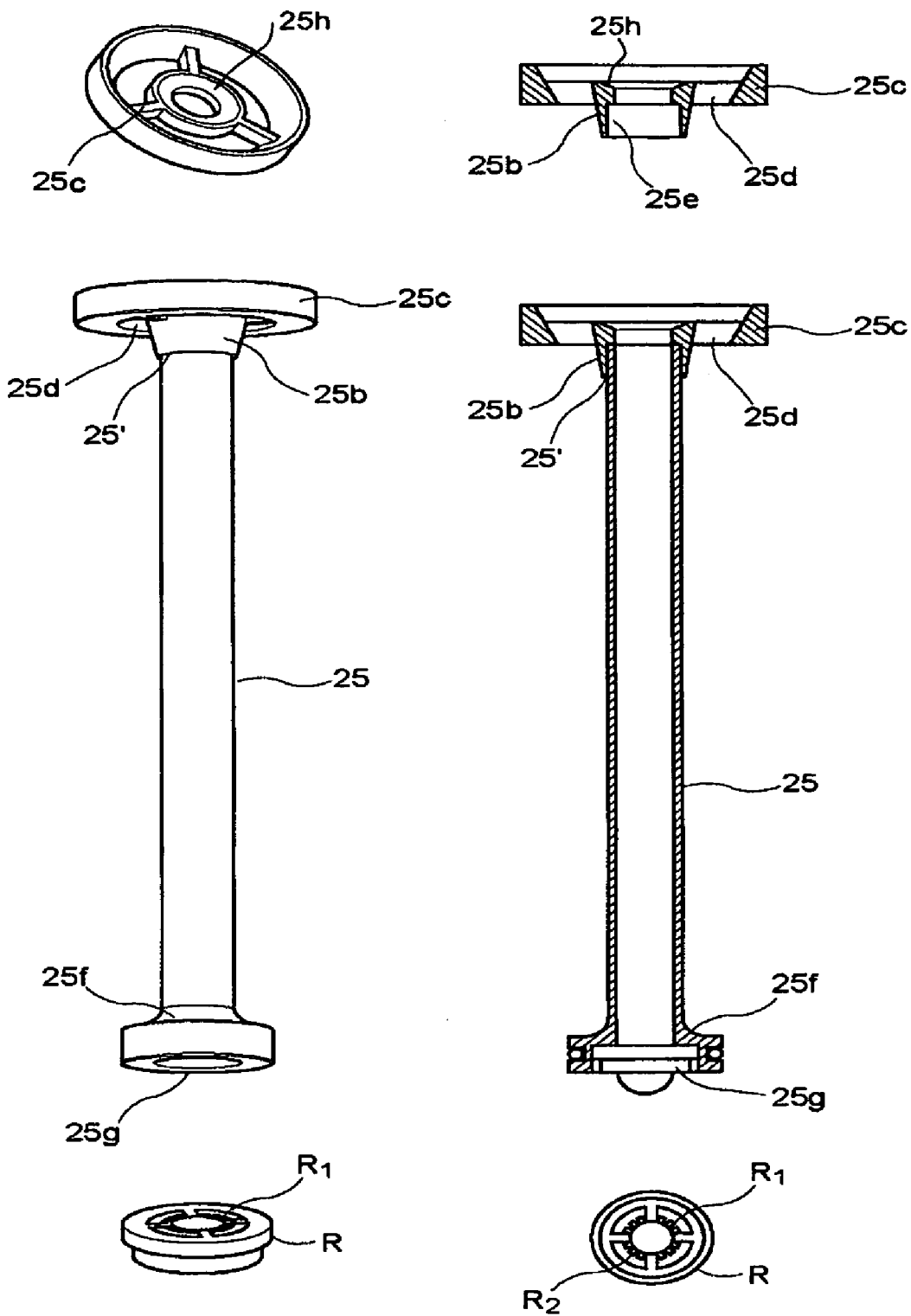
FIGURE 12A  FIGURE 12B

UNIVERSAL KINETIC DIVERTING SPOUT POST ASSEMBLY

FIELD OF THE INVENTION

This invention relates to a kinetic diverting apparatus installed with a spout post to be mounted in a vertical orientation with a roman tub or a deck mount installation. Particularly, the universal kinetic diverting spout post is designed for a roman tub or deck and provides for variation in the design of the spout which may be mounted with the cartridge assembly. The diverting apparatus includes a unique plunger assembly incorporated in a flow regulated diverting device.

BACKGROUND OF THE INVENTION

The following references are reviewed below.

Referring to U.S. Pat. No. 3,602,244, there is described and illustrated a valve assembly for use with a spout and a spray head. The assembly is best seen in relation to FIGS. 4 and 5. The operation of the valve is assisted with an antisiphon check valve (item 17) which prevents back flow into the supply pipe 13. When the water is turned on, water will flow into the body 24 as seen in FIG. 5, through opening 51 passing the outlet 20 of the spout 10. When the spray is activated water will then flow out the passageway 59 as a result of a differential pressure that exists which compresses the boot 46 as seen in FIG. 4 thereby raising the collar button 53 terminating the flow to the outlet 20. At this time the diaphragm 16 of the check 17 covers the opening 35 in the valve body because of the reduced outlet pressure. However this reference does not teach a spring in a plunger assembly or a diverting mechanism. The diversion is caused by the operation of a hand spray, the operation of which creates the pressure difference. But the supply hose of the spray is always under pressure and therefore may leak or even burst and cause considerable water damage.

Referring now to U.S. Pat. No. 3,913,605, there is taught a tub spout assembly adapted to be attached to a hand spray unit. A diverter valve is provided as best seen in FIGS. 1 and 2 which based on the operation thereof will divert water to the hand spray. When the diverting valve 26 is operated, the cup 60 is raised until the lip 70 contacts the seat 30 as best seen FIG. 4. Water entering into the diverter chamber 22 will exert an upward force on the inside lip 70 which force is sufficient to hold the lip 70 against the seat 30 thereby blocking the flow of water. No water will then be able to pass to the tub outlet 24. The reference lacks the teaching of a plunger spring and a plunger in a diverting apparatus.

Referring now to U.S. Pat. No. 4,116,210, there is a taught a diverter spout assembly as best seen in relation to FIG. 1 mounted on a supply pipe and including a passageway from the supply pipe to a discharge opening. A valve is operably mounted in the passageway to open and close the discharge opening and the alternate water path. The slide valve may be operated which will open aperture 24 to provide a passageway from the inner chamber 20 to divert water to and from the spout. The valve also includes an anti-siphoning feature. Again, this construction lacks the spring and the plunger of the present invention.

Referring now to U.S. Pat. No. 4,577,653, there is illustrated an anti-siphon diverter valve as best seen in relation to FIG. 1 in which as a result of a differential pressure between chambers 93 and 95 will move a shuttle in forward or reverse direction preventing undesirable knocking. When the spray is turned on, water supplied from the inlets 16 and 17 will create a high pressure in chamber 95 which allows the pressure from the water supply to press down on the lip valve member 32 which will result in the spout outlet receiving no water when the spray is turned on. This structure lacks a diverter which may be manually operated. The diversion is caused by the operation of the spray. The spray and supply hose therefore always have water present and are subject to water hammering and leakage or bursting. As a result of the consequence of operating the spray, the pressure differential is created which causes motion in the shuttle with the risk of water hammer and hose bursting.

Referring now to U.S. Pat. No. 4,862,524, there is illustrated a diverter valve including a valve body with a central passage which includes a spring biased design as best seen in FIGS. 3 and 4. The valve may be used with a faucet and auxiliary outlet and is mechanically biased toward a position to allow flow to pass to the spout. As a result of the manual movement of the valve member, the flow will pass to the hand shower unit. The valve will return to its original position upon the manual operation thereof to the first position.

Referring now to U.S. Pat. No. 6,381,770, there is taught an extendible bathtub spout as best seen in relation to FIG. 1 which includes in a preferred embodiment near the end thereof a combination check/diverter seen in FIG. 4 and as seen in FIG. 5 when that check/diverter is operated the flow will revert to the hand shower unit. No diverting valve assembly is described incorporating a plunger assembly design which is spring biased.

Finally, referring to U.S. Pat. No. 6,668,393, there is taught a height adjustable diverter spout assembly which includes a sleeve having an external threaded surface for deck mounting the sleeve, the exterior of the sleeve being threaded in part at least to interact with the interior threads of a sleeve for relative height adjustment of the spout interface. The installation is best observed in relation to the FIG. 2 and the sleeve interface at item 18. Clearly, the mounting of the spout with respect to this '393 patent involves a much more involved assembly than the present invention. Further, this assembly does not include for a flow regulator adjacent the outlet to the hand shower supply hose.

Nowhere within the prior art is there found a replaceable diverting cartridge for a spout post assembly which cartridge may include a pressure/flow regulating device to prevent water hammer and over-pressuring of the supply hose for a hand held shower unit when provided. Should the user of the installation desire at some point in time to replace the spout with a more aesthetically pleasing one, they merely replace the spout by disengaging it from the body and attaching the new spout. Therefore, there will be no requirement for removing the post or cartridge and the necessary repairs to the adjacent area of the valve. These features are not found in the prior art units.

It is therefore a primary object of this invention, to provide a universal kinetic diverting spout post assembly for a roman tub or deck installation in an integral structure which is entirely reliable and easily serviced.

It is also another object of this invention to provide a cartridge for a diverting spout post which offers the advantage of easily replacing the cartridge assembly.

It is a further object of this invention to provide a diverting spout post body which allows for the simple replacement of the spout by a standardized connection to the body of the assembly.

It is yet a further object of this invention to provide a diverting spout post assembly including plunger assembly which seals either the spout outlet or the hand shower outlet.

Further and other objects of the invention will become apparent to those skilled in the art when considering from the following summary of the invention and more detailed description of preferred embodiments illustrated herein.

SUMMARY OF THE INVENTION

According to a primary aspect of the invention there is provided a universal kinetic diverting spout post assembly for mounting in a vertical orientation in a roman tub or deck installation, said assembly comprising a valve body containing a replaceable diverting cartridge into which hot and cold water are fed, said cartridge including a spring biased plunger assembly normally closing the outlet to a second use, such as a hand shower or side spray, when water normally pass through the spout to a tub and until such time as a diverting mechanism, either in response to a predetermined pressure rise in the spout when water exiting the spout is prevented, or as a direct result of the user lifting the plunger assembly, wherein in either alternative the plunger assembly rises off it's seat and as a result closes the water path to the spout and at the same time opens the normally closed outlet to the hand shower or side spray and allows water to pass to the outlet, said assembly also including a flow regulator proximate the hand shower or side spray outlet to prevent overpressure in the supply hose and excessive water flow therein. In a preferred embodiment the valve body may further comprise an integral ring proximate the top thereof which includes a first fastener for a spout which includes a compatible second fastener.

According to another aspect of the invention there is provided a universal kinetic diverting spout post assembly for mounting in a vertical orientation in a roman tub or deck installation, said assembly being adaptable for mounting with a variety of aesthetically pleasing spouts, preferably having clean lines without a diverter rod and operator, said assembly comprising a generally cylindrical valve body having a top, and bottom and an interior wall and an exterior wall, said interior wall of said body defining proximate the top a generally cylindrical opening for receiving a diverting cartridge, said exterior wall of said body having disposed proximate the top thereof a mounting device for securing one of said variety of aesthetically pleasing spouts, (for example the mounting device may further comprise an annular channel provided at the top of the exterior wall with a ring shaped collar which is engaged by a pin or the like passing through an opening provided at the bottom fastening end of a spout), said body also having a separate hot and cold water inlet connected to a supply for hot/cold water, preferably disposed proximate the bottom thereof, the body being adapted proximate the top thereof to allow water to pass to the spout, and also having an outlet for a hand held shower or side spray unit proximate the bottom thereof, (in one embodiment the assembly may also include a separate nut for closing the hand held shower or side spray outlet should a hand held shower or side spray unit not be required), the assembly also comprising a replaceable generally cylindrical diverting cartridge contained within the opening defined by the interior cylindrical wall of said body, said cartridge having a top and a bottom and an exterior and an interior and having disposed proximate the bottom thereof separate hot and cold water inlets for permanent alignment with the hot and cold water inlets of said body when the cartridge is inserted in the interior wall opening of the body, the cartridge also having an internal water path disposed in the interior thereof to allow water to pass to the spout, the cartridge also having an outlet disposed proximate the bottom thereof in permanent registration with the outlet of said body for the hand shower or side spray unit, the interior of the cartridge including a hollow cylindrical tube having a top and a bottom and being permanently engaged with the outlet of said cartridge and said body proximate the bottom of the tube, the tube extending intermediate the top of said cartridge to provide a water path to the hand held shower or side spray, the bottom of said tube being engaged with a flow regulator adjacent the hand spray outlet of the cartridge and body to limit the flow and the pressure permitted to the hand held shower or side spray unit when water is permitted to flow in the tube by the diverting assembly, and thus prevent over pressuring and eventual bursting of a hose leading to the hand held shower or side spray, said hollow cylindrical tube having a top and being engaged thereat by an annular plunger seat for normal sealing engagement with a resilient plunger of a, preferably pressure responsive or other wise user operable, plunger assembly disposed within the top of the hollow cylindrical interior of said cartridge, said plunger assembly including a preferably generally cylindrical vertically oriented pin having a top and bottom and having disposed proximate the bottom thereof said resilient plunger and having disposed proximate the top thereof a resilient diaphragm, (preferably anchored proximate the top of said cartridge by a cartridge cap disposed proximate the top of said cartridge), to limit the vertical motion of said pin, said pin and diaphragm also engaging a diaphragm support proximate the top thereof as well, said pin of said plunger assembly being resiliently biased to the normal plunger position, (and preferably including a spring of predetermined stiffness disposed about the perimeter of said pin to ensure that the plunger is normally seated on the annular plunger seat,) as water flows to the spout outlet, which also prevents water from flowing to the hand held shower or side spray unit under normal flow conditions, wherein water is prevented from exiting to the spout by preventing water flow from the body to the spout as the top of the plunger, by either motion thereof in response to a buildup of water pressure in the spout or alternatively by operation of the plunger by the user, causes the plunger to disengage the annular seat (preferably as established by the stiffness of the spring or by the user operation of said plunger by a knob attached to a rod engaged with the top of the cylindrical pin,) said diaphragm of said plunger assembly being fixed in position and limiting the motion of the top of the pin and the plunger of said assembly, wherein the plunger assembly of said diverting post assembly when seated on the annular plunger seat prevents the water flow to the hand held shower or side spray minimizing the risk of the hose bursting, further by the provision of a flow regulator in said cartridge excessive amounts of pressure is prevented from building up in the supply hose of the hand held shower or spray, preferably said universal diverting cartridge when installed in a vertical orientation in a roman tub or as a deck mounted unit is adaptable to accept a variable number of aesthetically pleasing replaceable spout designs.

In a preferred embodiment, the diverting assembly may further comprise a mounting nut disposed on the exterior of the body which is threaded to receive the nut, said nut including flanges to engage the bottom of the china rim or the deck of the installation, and cooperate with the top of the body containing the device for mounting the spout which further includes flanges for engaging the top of the rim or the deck of the installation wherein the diverting spout may be secured to the rim or deck in a vertical orientation by the rotation of the nut on the threaded body to secure the assembly in position on the rim or the deck. In this way variations in the thickness of the deck and the rim are accommodated for.

According to another embodiment of the invention, the preferred ring shaped collar disposed proximate the top of the body may be replaced by any ring device that is compatible with the specific spout being mounted on the body. The fastener may be the annular channel described above but it may vary, for example, a threaded fastening for the spout to a cooperative threading of the ring. Normally, however, the body would be standard with the exception of the ring which may in fact be standard as well depending on the spout being mounted thereon.

One of the advantages of the present invention is that the supply hose to the hand held shower unit does not contain any water flow or pressure until such time as the diverter plunger is moved to a position to allow water to flow to the hose. In this way, water hammer problems known with prior art installations and the risk of bursting the hose is now to a minimum.

In yet another embodiment of the invention, the plunger seat mounted on the top of the tube has a general wheel shaped configuration and which will mount on the top of the tube via flange portions of the plunger seat covering the top of the tube and disposed on the bottom of the generally wheel shaped plunger seat, said seat assembly having positioned adjacent the seat, passages to allow water to pass through to the spout. In another embodiment, the end of the tube remote the plunger seat includes a flow regulator having a top and a bottom and having provided proximate the top thereof a flange portion for engaging the bottom of said tube also for engagement with the flow regulator.

As necessary, the water way through the valve to the spout is provided through the cap of the diverter assembly, the details of which are not shown.

In another embodiment the nut provided to close off the outlet to the spray is generally hexagonal in shape and has an internal threading provided therewith to contact threading on the body on the exterior of the outlet to the spray to close off that outlet should a spray not be provided.

In a preferred embodiment, the plunger assembly may further comprise a plunger having a general button shape and a flat top for sealing engagements and closing the water way to the spout and having on the end remote the flat top a tapered sealing surface for engaging with the plunger seat and also to provide surfaces against which any excess water pressure resulting from water being prevented from passing through the spout will cause the lifting of the plunger assembly via force exerted on these tapered walls. Preferably, a pin is contained within the opening provided in the plunger to fix the plunger in the assembly.

In a preferred embodiment, the plunger pin has engaged proximate the top thereof opposite the plunger a diaphragm fixed in position in relation to the pin anchored proximate a cap of the diverting assembly, the diaphragm also being held in position proximate the pin via a diaphragm support through which the pin passes, the diaphragm support and the plunger being separated by a spring of predetermined stiffness.

In an alternative embodiment of the invention, the top of the pin adjacent the diaphragm and the diaphragm support extends to diverting rod and diverting knob for manual operation of the plunger assembly. As a result, the overall assembly ensures that water pressure is retained in the spout post only and not in the supply hose to the hand held shower until such time as the diverter allows for passage of water to the supply hose.

Further, aesthetic spout designs may be used with the present invention by merely changing the configuration of the linkage ring provided at the top of the housing body.

BRIEF DESCRIPTION OF THE DRAWINGS

FIGS. 10a and 11b illustrate item 29 in section and in perspective.

FIGS. 11a and 11b illustrate plunger 28 in section and in perspective.

FIGS. 12a and 12b are illustrated in perspective and side section views, illustrating the post 25 shown in FIG. 1 and the unique parts in relation thereto.

DETAILED DESCRIPTION OF THE PREFERRED EMBODIMENTS

Figure 1:
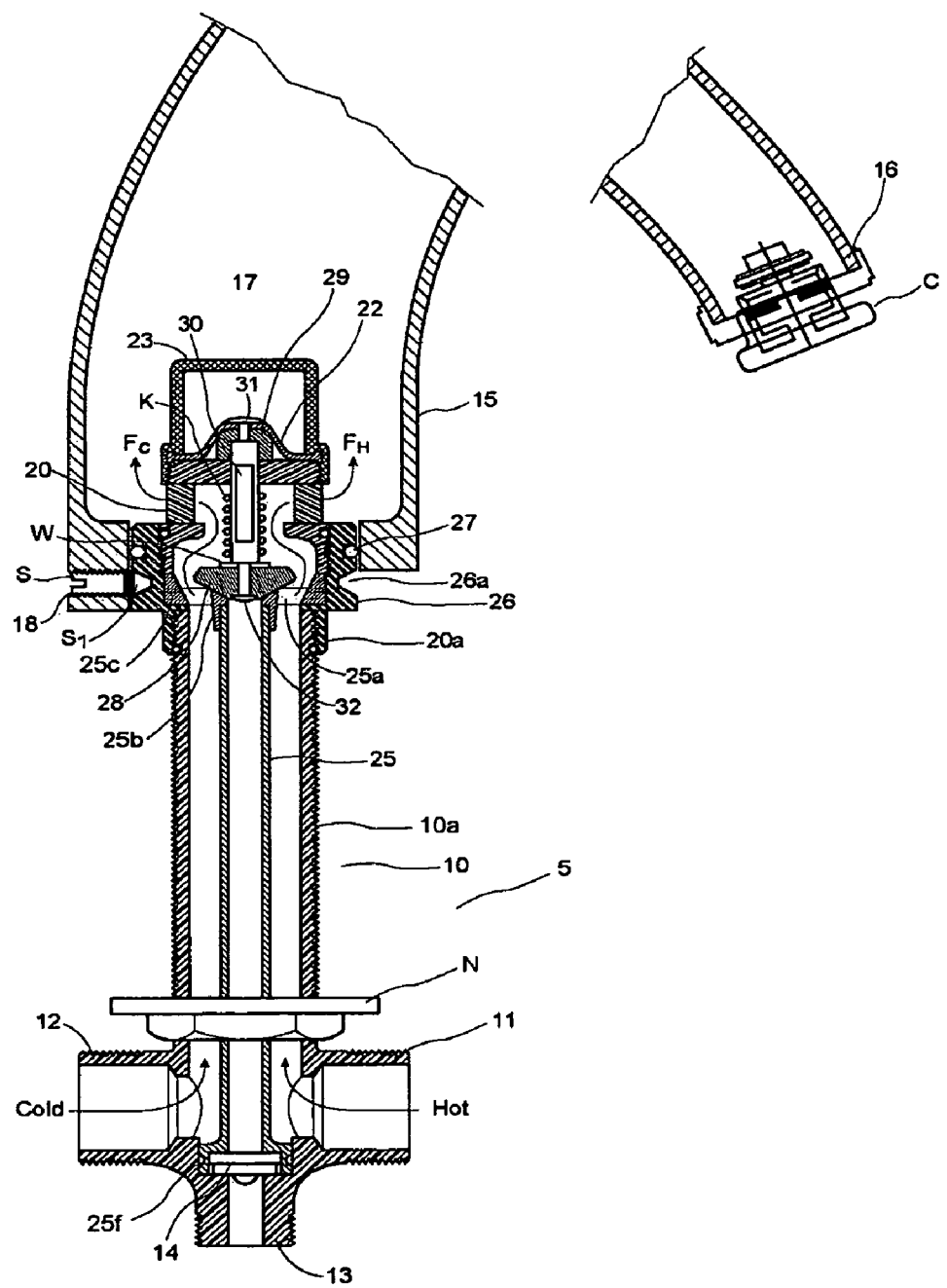
FIG. 1 is a side view of the kinetic diverting spout post illustrated in a preferred embodiment of the invention.
Figure 2:
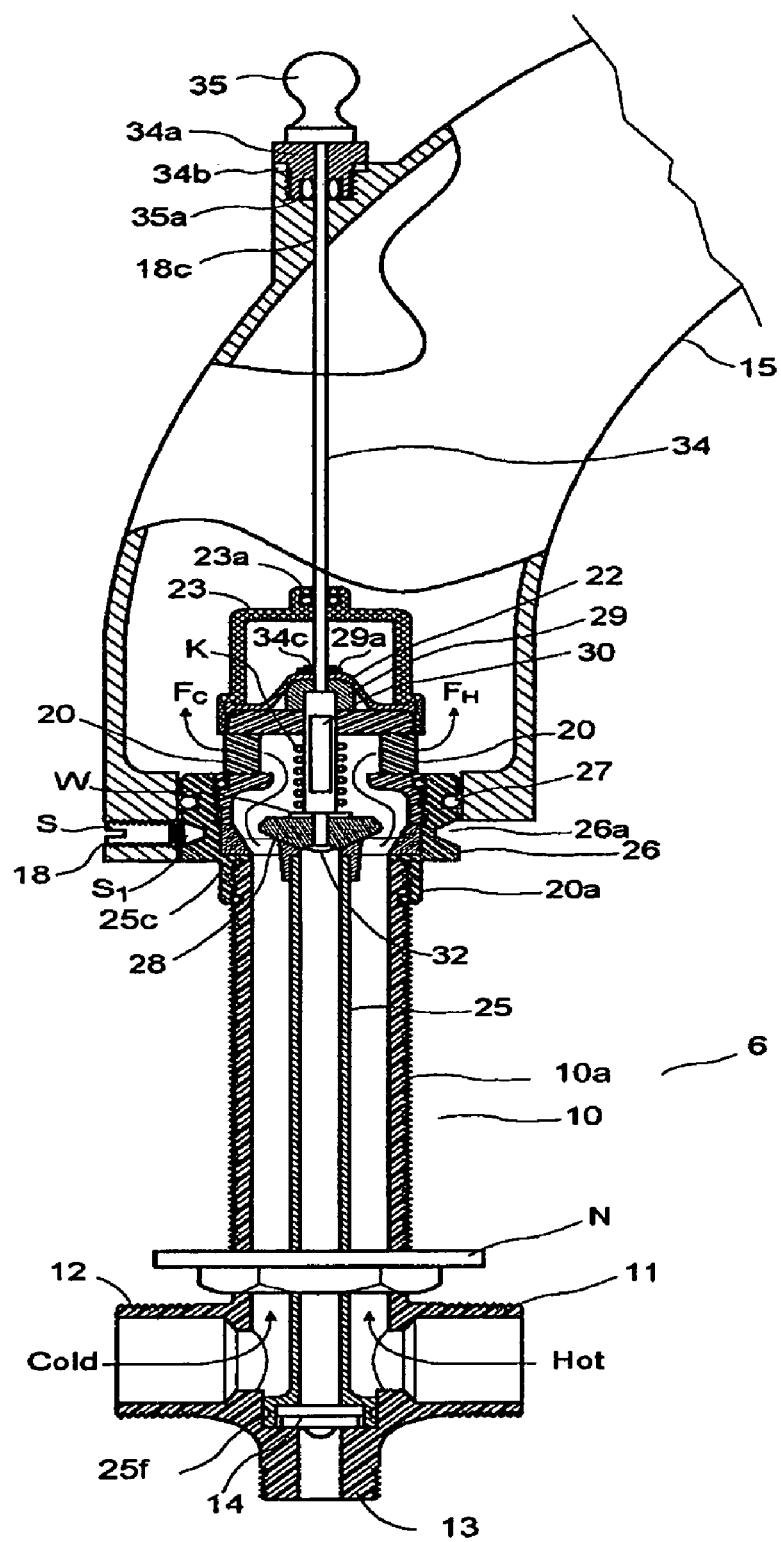
FIG. 2 is an alternative embodiment of the invention of FIG. 1.
Figure 3:
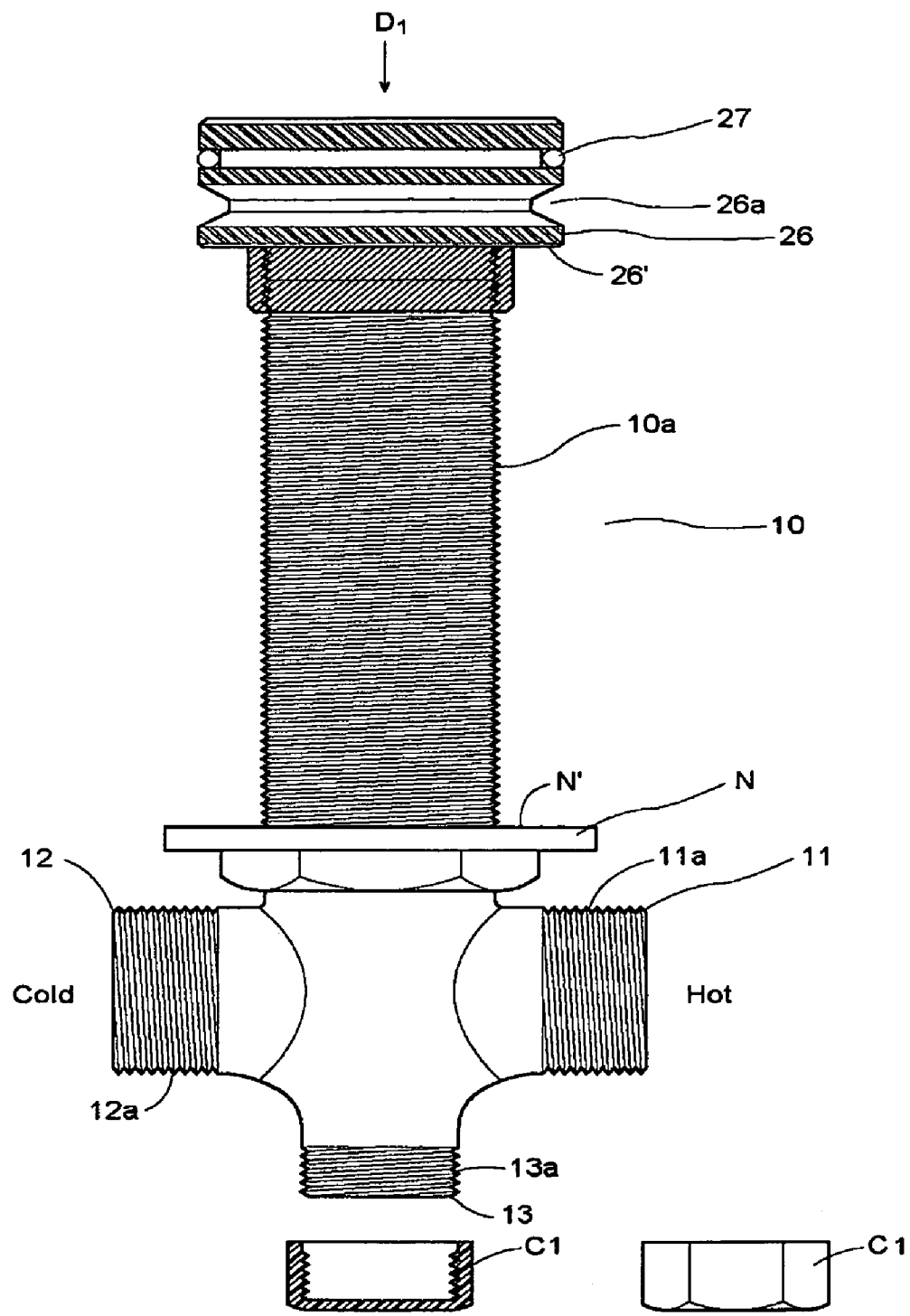
FIG. 3 is the side view of the housing 10 of FIG. 1 illustrated in a preferred embodiment of the invention.
Figure 4:
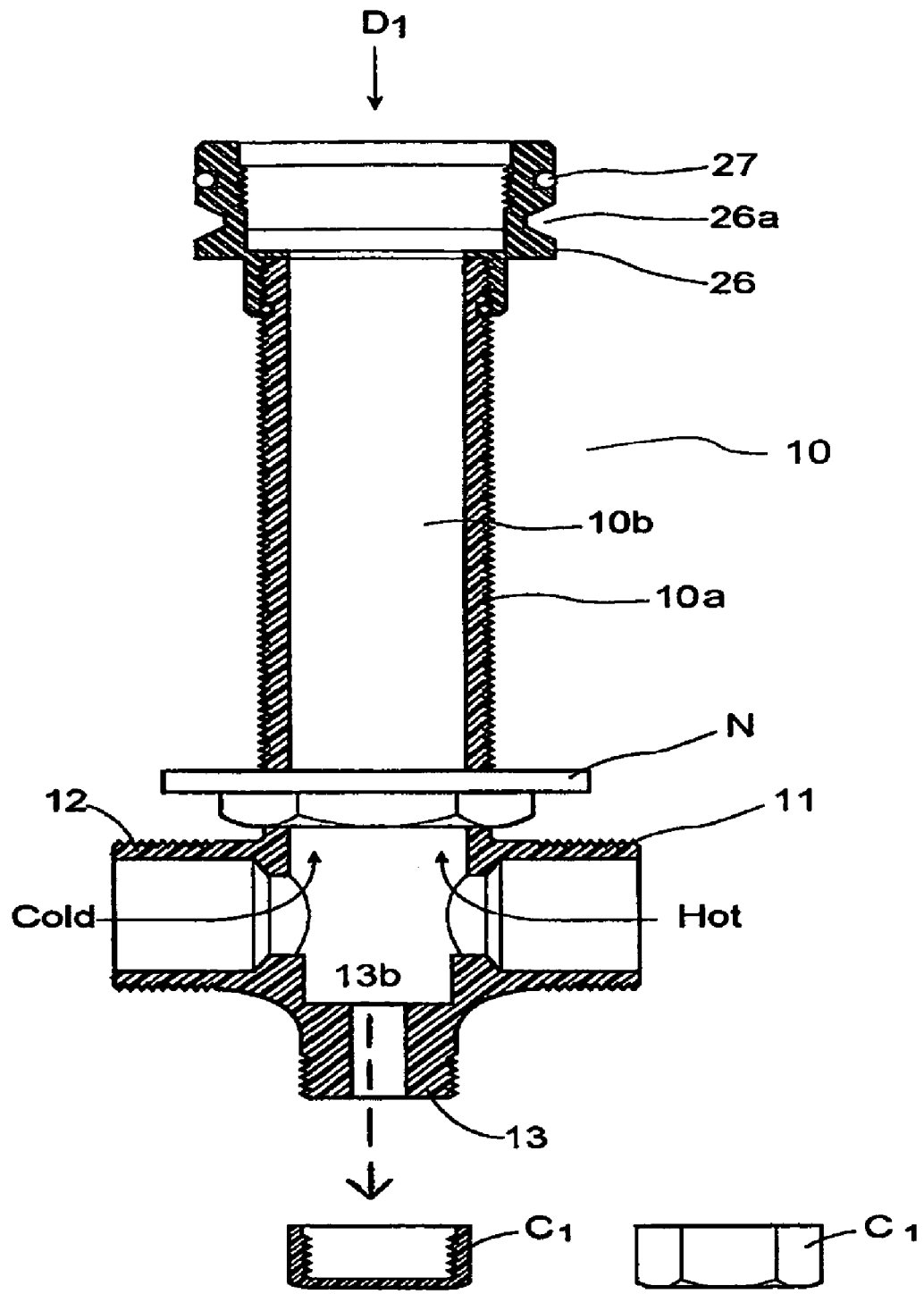
FIG. 4 is a section view of the housing of FIG. 3.

Referring to FIGS. 1, 3, 4, 5, 6, and 12a and 12b, there is illustrated the preferred embodiment of the invention for a universal kinetic diverting spout post which is installed in a vertical orientation with a roman tub installation. The assembly 5 therefore includes a housing 10 as best seen in relation to FIGS. 3 and 4 which housing includes a body 10 having a top and bottom and two sides. The top includes an opening 10b as best seen in FIG. 4, which receives the cartridge 20 within the opening 10b either with the initial installation with the roman tub or receives the cartridge 20 as a replacement cartridge should the first cartridge fail. The housing includes inlets 11 and 12 for hot and cold water flow respectively, into the valve which flow is in the directions shown in FIG. 1 into the actual spout 15. The spout 15 is fixed onto the housing 10 proximate the top thereof within the annular groove 26a adjacent the ring 26. The pin S as best seen in FIG. 1 engages the annular groove 26a and fastens the spout 15 in place over the cartridge 20. The spout 15 may be of any design compatible with the mounting thereof via the pin S or by alternative means. In this way, unique aesthetic designs for spouts having clean lines can be achieved with the preferred embodiment. Alternatively, a diverting mechanism as shown in FIG. 2 may be provided. However, should it be desired to include the spout 15 in FIG. 2, the same mounting arrangement may be provided with pin S located in groove 26a of ring 26 via tapered end S1 of the pin S within opening 18 of the spout. Unlike the installation of FIG. 1, FIG. 2 includes a diverting rod 34 connected to the diverting knob 35 to operate the diverting mechanism in a manual manner. In both FIG. 1 and FIG. 2, a nut N is provided for tightening below the deck assembly once the diverting spout is installed. The nut may be tightened upon the threaded portion 10a of the body as best seen in FIG. 3 to engage the bottom of the rim or deck which engage may also by the flanges 26 of the ring. Therefore upon tightening of nut N it will engage the bottom of the deck and flanges 26 will engage the top portion of the deck thereby securing the diverting spout and hence this entire spout assembly in position as shown in FIGS. 1 and 2, and providing for variation in the rim and deck thickness from installation to installation.

As best seen in FIGS. 12a and 12b, the cartridge assembly 20 includes a tube 25 contained within the cartridge which as best seen in FIGS. 12a and 12b, and which has a generally wheel shaped seat 25c disposed proximate the top and engaging said top of the tube 25 at an annular portion 25b. The tube 25 has a bottom portion engaged by a flange 25f which connects to the flow regulator portion R. The flow regulator portion sits within the opening 25g of the tube assembly proximate the annular flange 25f located at the bottom of the tube 25. The top of tube 25 includes a upper end 25' which engages with the annular flange 25b to secure the portion 25c proximate the top thereof. The seat 25 includes a contoured seat surface 25h which engages the plunger 28 as best seen in FIGS. 11a and 11b proximate the corresponding surfaces 28x which seals against the contoured surface 25h of the wheel shaped portion 25c.

The plunger 28 is secured in position via a pin 30 having top and bottom securing portions 31 and 32 respectively and sealed adjacent the plunger 28 with a washer W as best seen in FIG. 1. The pin assembly includes proximate the top thereof a diaphragm support 29 and diaphragm 22 located within and secured by the cartridge cap 23 of the diverting cartridge. A spring K is provided extending around the pin 30 of a particular stiffness and separating the diaphragm support and plunger. The spring holds the plunger in a predetermined position closing the shower outlet, but which may be overcome sufficiently when water flow is prevented from exiting the spout.

The flow regulator R of FIGS. 12a and 12b, includes restricted pathway portions R1 about its circumference to limit the flow through the flow regulator R contained with an opening 14 for the cartridge and 13b of the housing of FIG. 4.

Typically, the outlet 13 is installed so as to engage with a hand held shower provided with the roman tub assembly. The spout 15 includes at the end 16 thereof a diverting mechanism combination check valve C which is known in the art, for example found in U.S. Pat. No. 6,381,770 and used to block the passage of water from the exit of the spout 16. The details of the construction of the diverting mechanism combination check valve found in U.S. Pat. No. 6,381,770 is incorporated by reference with respect to the teaching thereof and no further explanation will be provided. Other equally effective mechanism which might be installed at the end of the spout to provide the diverting function would equally work.

Figure 5:
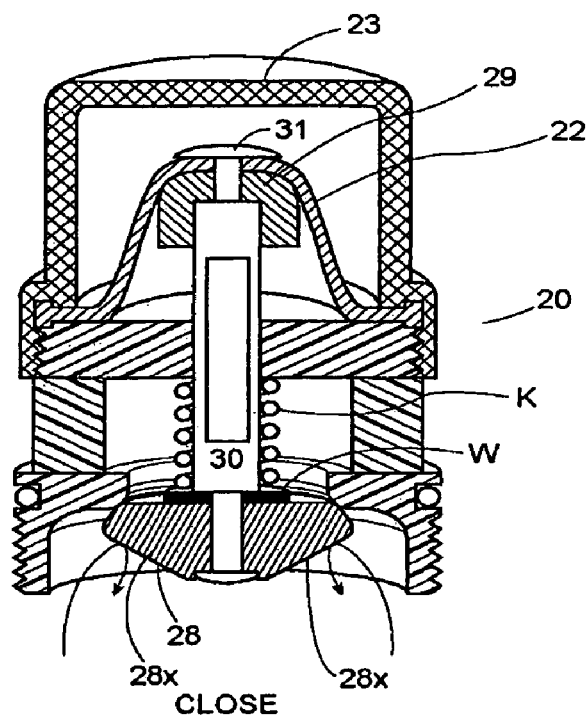
FIGS. 5 and 6 are close-up side views in section of the cartridge of FIG. 1 illustrating the open and closed positions of the kinetic diverting mechanism in relation to the spout outlet and illustrated in a preferred embodiment of the invention.
Figure 6:
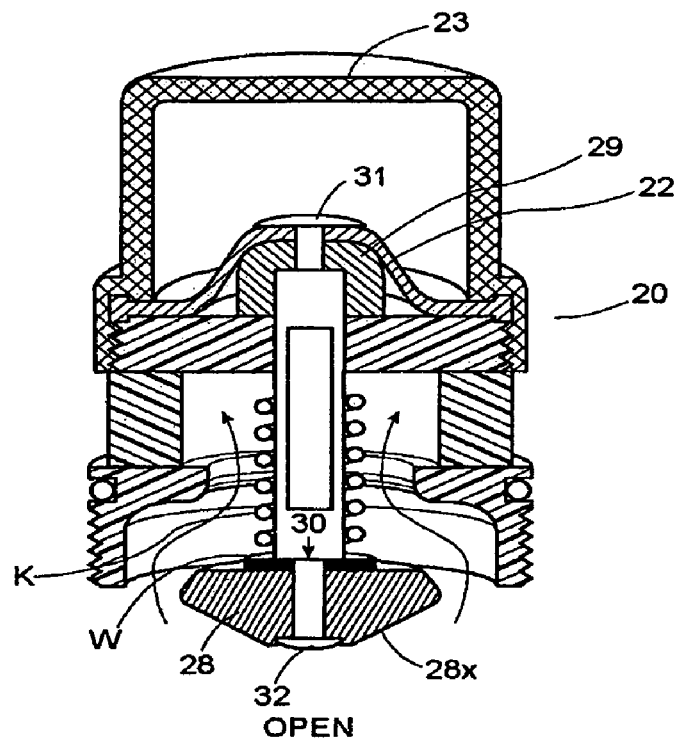

In operation, for the embodiment of FIG. 1, a supply valve for hot and cold water would be operated by the bather to allow water to enter within water inlets 12 and 11 of the housing 10 of the assembly. Water entering the housing would flow up toward the top of the cartridge 20 and pass around the plunger 28 and its seat 25c and around and through the openings 25d as best seen in FIG. 12a through the top flange 25d and into the spout area 17 allowing water to be mixed and pass out the end of the spout 16 under normal operations when filling a tub. However, when it is desired to divert the water from the spout momentarily to a hand shower, the stop mechanism C would be operated by the bather allowing for the build up of pressure within the spout within chamber area 17. The build up of pressure in the spout would in effect cause the water traveling within the riser portion of the cartridge to engage the side portions 28x of the plunger 28, as best seen in FIGS. 5 and 6, which will cause the plunger to rise off its seat 25h as best seen in FIG. 12b and to thereby allow water to exit down the tube 25 within the interior thereof toward the flow regulator R and out the outlet 13 toward the supply tube to the hand held shower. As described in the Background of the Invention, it is a necessary aspect of the invention to provide the flow regulator R to limit the flow of water to the shower to 9 liters per minute and also to prevent over pressuring of the hose connected to the hand shower unit. Typically, as described in the Background of the Invention these hoses can burst because water pressure is normally exerted in the hose at all times. The flow from the hand shower in prior art installations only occurs with the operation of the hand shower operating lever which relieves the pressure normally present in the hose, which over time may cause the hose to burst and result in costly repairs and water damage. The present invention provides for the plunger 28 to be seated at all times on the seat 25h of the tube assembly 25 until such a time as the water pressure rises in the spout because of the operation of the stop mechanism C, wherein that water pressure from the hot and cold water supply will overcome the spring K by exerting a force on side surfaces 28x of the plunger 28 and allow the plunger 28 to move from the position shown in FIG. 6 to the position shown in FIG. 5 whereat the water will flow to hand held shower but will not flow at such a high level as to cause over pressure.

Clearly in the embodiment of FIG. 1, based on the operator closing the stop C of the spout, the diverting action is kinetic and requires no further action or operation from the bather. By operating the stop C, the hand shower will therefore be very quickly accessible. The stop therefore doubles as a diverting operator by initiating the kinetic diverting action provided in the design of the cartridge.

Figure 7:
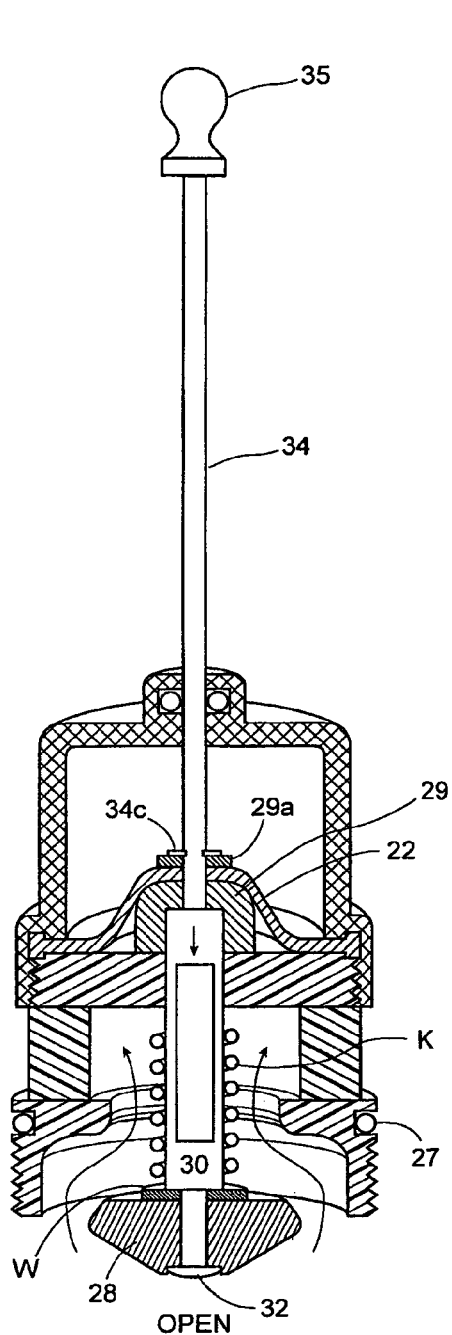
FIGS. 7 and 8 are similar views to FIGS. 5 and 6 illustrated with respect to the assembly of FIG. 2 and illustrated in an alternative embodiment of the invention.
Figure 8:
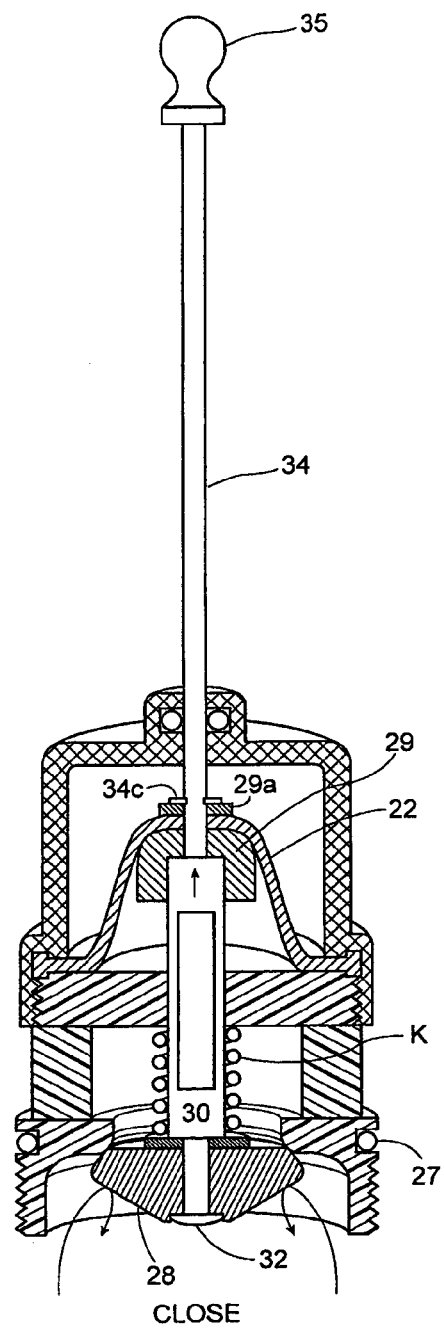

Should however it be desired to mount a different spout with the cartridge assembly of FIG. 2 which includes the diverting rod 34 and the operator 35 as known in the art, the cartridge assembly and the housing particularly as described above via ring 26, will allow for mounting of that spout and the cartridge will provide for the pressure regulation by providing the regulating device R proximate outlet 13. The operator will operate the knob 35 instead of the stop C of FIG. 1. Otherwise, the operation of the valve is very similar. All the other parts with the exception of the diverting rod 34, the O ring 23a, a clip 20 to hold the top cartridge assembly in position and a diaphragm support washer W are required as alternative elements of the installation. FIG. 2 illustrates the manual operation of the plunger 28 to move it away from its annular seat 25h. The bather will operate the knob 35 to raise the plunger 28 from the top of the seat 25h thereby allowing water to flow down the tube 25 toward the hand shower outlet and to block the passage of water into the spout 17. The assembly 6 therefore is very similar to assembly 5 with the exception of the operator for the bather. FIGS. 7 and 8 when compared to FIGS. 5 and 6 illustrate the operation of the plunger 28 in either embodiment.

Figure 9:
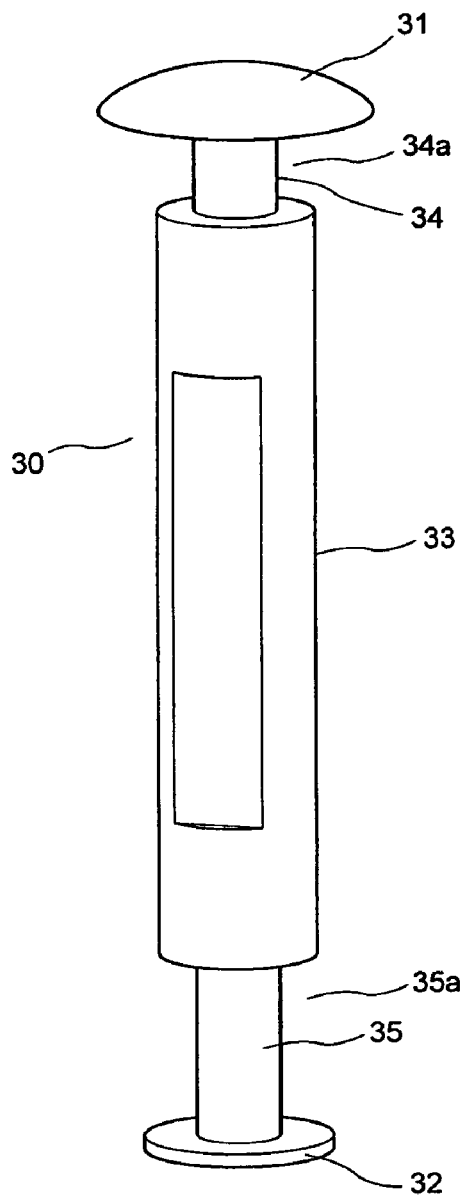
FIGS. 9, 9a and 9b illustrate the pin 30 of FIG. 1 illustrated in perspective bottom and section views in a preferred embodiment of the invention.
Figure 9A:
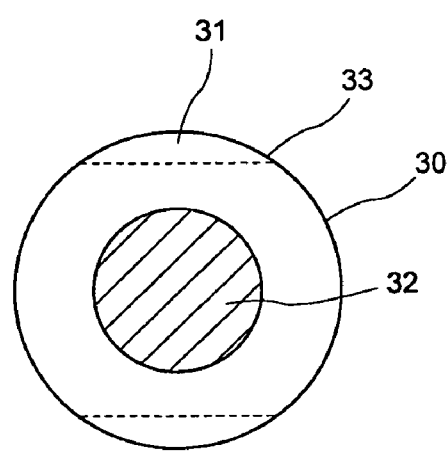
Figure 9B:
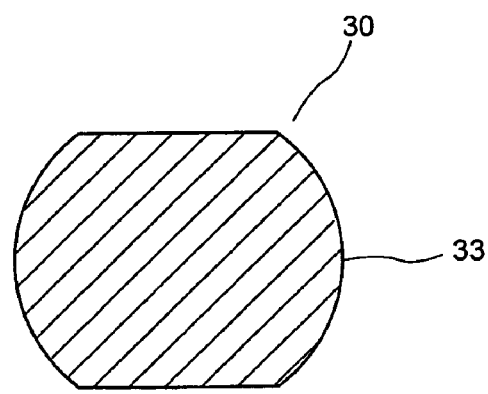

Referring now to the pin assembly 30, as best seen in FIGS. 9, 9a and 9b, the pin assembly 30 has a top retainer portion 31, bottom retainer portion 32 to hold the spring K around the perimeter of pin 30. The perimeter is elliptical as best seen in FIG. 9b at item 33. Channels 34a and 35a are provided with smaller diameter pin portions 34 and 35 respectively in order to allow for retaining of the plunger 28 and the diaphragm support 29, the design of which is best seen in FIGS. 10a and 10b and 11a and 11b respectively. The openings 28y and 28v are provided to allow the passage of pin portions 34 and 35 therethrough.

It is not necessary in every embodiment of the invention to provide for the use of a diverting mechanism. The assembly is of a sufficient advantages that should a hand spray not be required then the nut portion C1 may be used to cap off the outlet 13 via threaded portions 13a. The universal spout mounting aspect of the invention would still apply but the cartridge would not include a plunger design. However, with the same unique design, should it ever be desired to install a hand spray, the appropriate replacement cartridge would be installed within the same body 10 of the valve assembly 5 to provide this feature. The nut C1 would therefore be removed and the hand spray would be connected to outlet 13.

The spout design may be changed by reconfiguring of the ring 26 of body 10, if necessary, for the spout to engage with the deck surfaces. With the present design of the invention the water pressure is always retained in the spout and not in the hand held shower supply hose, which will eliminate the over pressuring and bursting of the hose. The body 10 will generally be standard within this assembly regardless of the unique diverting cartridge installed therein allowing for aesthetics of the spout design to vary from manufacturer to manufacturer.

As many changes can be made to the embodiments of the invention without departing from the scope thereof. It is intended that all matter contained herein be considered illustrative of the invention and not in a limiting sense.

The embodiments of the invention in which an exclusive property or privilege is claimed are as follows:

1. A universal kinetic diverting spout post assembly for mounting in a vertical orientation in a roman tub or deck installation, said assembly comprising a valve body containing a replaceable diverting cartridge into which hot and cold water are fed, said cartridge including a spring biased plunger assembly normally closing an outlet to a second use, such as a spray, water normally passing through a spout to a tub until operation of diverting mechanism, causing a predetermined pressure rise in the spout when water exiting the spout is prevented, whereat the plunger assembly rises off it's seat and as a result closes the water path to the spout and at the same time opens the normally closed outlet to the second use and allows water to pass to that outlet, said universal kinetic diverting spout post assembly also including a flow regulator proximate the second use outlet to prevent overpressure in a supply hose and excessive water flow therein.

2. The universal kinetic diverting spout post assembly of claim 1 wherein the valve body further comprises an integral ring proximate the top thereof which includes a first fastener for a spout which includes a compatible second fastener.

3. The universal kinetic diverting spout post assembly of claim 2 wherein the configuration of the integral ring provided at the top of the housing body is changed to accommodate various spout designs.

4. A universal kinetic diverting spout post assembly for mounting in a vertical orientation in a roman tub or deck installation, said assembly being adaptable to accept a variety of replaceable spout designs, said assembly comprising a generally cylindrical valve body having a top, and bottom and an interior wall and an exterior wall, said exterior wall of said body having disposed proximate the top thereof a mounting device for securing one of said variety of replaceable spout designs, said body also having a separate hot and cold water inlet connected to a supply for hot/cold water, the body being adapted proximate the top thereof to allow water to pass to a spout, and also having an outlet for a hand held shower or side spray unit proximate the bottom thereof, the assembly also comprising a replaceable generally cylindrical diverting cartridge contained within the opening defined by the interior cylindrical wall of said body, said cartridge having a top and a bottom and an exterior and an interior and having disposed proximate the bottom thereof separate hot and cold water inlets for permanent alignment with the hot and cold water inlets of said body when the cartridge is inserted in the interior wall opening of the body, the cartridge also having an internal water path disposed in the interior thereof to allow water to pass to the spout, the cartridge also having an outlet disposed proximate the bottom thereof in permanent registration with the outlet of said body for the hand shower or side spray unit, the interior of the cartridge including a hollow cylindrical tube having a top and a bottom and being permanently engaged with the outlet of said cartridge and said body proximate the bottom of the tube, the tube extending intermediate the top of said cartridge to provide a water path to the hand held shower or side spray, the bottom of said tube being engaged with a flow regulator adjacent the hand spray outlet of the cartridge and body to limit the flow and the pressure permitted to the hand held shower or side spray unit when water is permitted to flow in the tube by the diverting assembly, and thus prevent over pressuring and eventual bursting of a hose leading to the hand held shower or side spray, said hollow cylindrical tube having a top and being engaged threat by an annular plunger seat for normal sealing engagement with a resilient plunger of a pressure responsive plunger assembly disposed within the top of the hollow cylindrical interior of said cartridge, said plunger assembly including a vertically oriented pin having a top and bottom and having disposed proximate the bottom thereof said resilient plunger and having disposed proximate the top thereof a resilient diaphragm, to limit the vertical motion of said pin, said pin and diaphragm also engaging a diaphragm support proximate the top thereof as well, said pin of said plunger assembly being resiliently biased to the normal plunger position, as water flows to the spout outlet, which also prevents water from flowing to the hand held shower or side spray unit under normal flow conditions, wherein water is prevented from exiting to the spout by preventing water flow from the body to the spout as the top of the plunger, by either motion thereof in response to a buildup of water pressure in the spout or alternatively by operation of the plunger by the user, causes the plunger to disengage the annular seat, said diaphragm of said plunger assembly being fixed in position and limiting the motion of the top of the pin and the plunger of said assembly, wherein the plunger assembly of said universal kinetic diverting spout post assembly when seated on the annular plunger seat prevents the water flow to the hand held shower or side spray minimizing the risk of the hose bursting, further by the provision of a flow regulator in said cartridge, any excessive amount of pressure is prevented from building up in the supply hose of the hand held shower or spray.

5. The universal kinetic diverting spout post assembly of claim 4 wherein the spout has clean lines without a diverter rod and operator.

6. The universal kinetic diverting spout post assembly of claim 4 or 5 wherein the mounting device further comprises an annular channel provided at the top of the exterior wall with a ring shaped collar which is engaged by a pin passing through an opening provided at the bottom fastening end of a spout.

7. The universal kinetic diverting spout post assembly of claim 4 wherein the separate hot and cold water inlets are disposed proximate the bottom thereof.

8. The universal kinetic diverting spout post assembly of claim 4 further comprising a separate nut for closing the hand held shower or side spray outlet should a hand held shower or side spray unit not be required.

9. The universal kinetic diverting spout post assembly of claim 4 wherein said pin is generally cylindrical.

10. The universal kinetic diverting spout post assembly of claim 4 wherein the diaphragm is anchored proximate the top of said cartridge by a cartridge cap disposed proximate the top of said cartridge.

11. The universal kinetic diverting spout post assembly of claim 4 wherein a spring of predetermined stiffness is disposed about the perimeter of said pin to ensure that the plunger is normally seated on the annular plunger seat.

12. The universal kinetic diverting spout post assembly of claim 4 or 5 wherein said universal diverting cartridge when installed in a vertical orientation in a roman tub or as a deck mounted unit is adaptable to accept a variable number of replaceable spout designs.

13. The universal kinetic diverting spout post assembly of claim 1, 2 or 4 further comprising a mounting nut disposed on the exterior of the body which is threaded to receive the nut, said nut including flanges to engage the bottom of a china rim or a deck of the installation, and cooperate with the top of the body containing the device for mounting the spout which further includes flanges for engaging the top of the rim or the deck of the installation wherein the diverting spout may be secured to the rim or deck in a vertical orientation by the rotation of the nut on the threaded body to secure the assembly in position on the rim or the deck and in this way variations in the thickness of the deck and the rim are accommodated for.

14. The universal kinetic diverting spout post assembly of claim 1, 2, or 4 further comprising a tube and a plunger seat mounted on the top of the tube, this plunger seat has a general wheel shaped configuration mounted on the top of the tube via flange portions of the plunger seat, while said seat comprises passages to allow water to pass through to the spout.

15. The universal kinetic diverting spout post assembly of claim 1, 2 or 4 further comprising a tube wherein the end of the tube remote the plunger seat includes a flow regulator having a top and a bottom and having provided proximate the top thereof a flange portion for engaging the bottom of said tube also for engagement with the flow regulator.

16. The universal kinetic diverting spout post assembly of claim 8 wherein the nut provided to close off the outlet to the spray is generally hexagonal in shape and has an internal threading provided therewith to contact threading on the body on the exterior of the outlet to the spray to close off that outlet should a spray not be provided.

17. The universal kinetic diverting spout post assembly of claim 1, 2, or 4 wherein the plunger assembly further comprises a plunger having a general button shape and a flat top for sealing engagements and closing the water way to the spout and having on the end remote the flat top tapered sealing surfaces for engaging with the plunger seat and also to provide surfaces against which any excess water pressure resulting from water being prevented from passing through the spout will cause the lifting of the plunger assembly via force exerted on these tapered sealing surfaces.

18. The universal kinetic diverting spout post assembly of claim 17 further comprising a pin contained within the opening provided in the plunger to fix the plunger in the assembly.

19. The universal kinetic diverting spout post assembly of claim 18 wherein the plunger pin has engaged proximate the top thereof opposite the plunger a diaphragm fixed in position in relation to the pin anchored proximate a cap of the diverting assembly, the diaphragm also being held in position proximate the pin via a diaphragm support through which the pin passes, the diaphragm support and the plunger being separated by a spring of predetermined stiffness.

20. The universal kinetic diverting spout post assembly of claim 19 wherein the top of the pin adjacent the diaphragm and the diaphragm support extends to a diverting rod and a diverting knob for manual operation of the plunger assembly.

* * * * *